US005988304A

United States Patent [19]
Behrendts

[11] Patent Number: 5,988,304
[45] Date of Patent: Nov. 23, 1999

[54] WHEELCHAIR COMBINATION

[76] Inventor: Mickey J. Behrendts, Strandvägen 2, S-696 02 Hammar, Sweden

[21] Appl. No.: 08/776,143

[22] PCT Filed: Jun. 16, 1995

[86] PCT No.: PCT/SE95/00737

§ 371 Date: Dec. 23, 1996

§ 102(e) Date: Dec. 23, 1996

[87] PCT Pub. No.: WO95/35082

PCT Pub. Date: Dec. 28, 1995

[30] Foreign Application Priority Data

Jun. 22, 1994 [SE] Sweden ................................. 9402199

[51] Int. Cl.[6] ................................ B60K 1/02; B62B 3/02
[52] U.S. Cl. ............................ 180/65.1; 180/907; 180/11
[58] Field of Search ................................... 180/65.1, 907, 180/11, 15, 16, 22, 24.02, 24.03, 216, 217, 218, 208; 280/304.1, 250.1, 282, 47.16, 43

[56] References Cited

U.S. PATENT DOCUMENTS

| | | | |
|---|---|---|---|
| 2,495,573 | 1/1950 | Duke | 180/15 |
| 2,710,659 | 6/1955 | Moederle | 180/11 |
| 3,351,148 | 11/1967 | Solomon | 180/6.5 |
| 4,767,130 | 8/1988 | Fu-Chao | 280/202 |
| 4,898,508 | 2/1990 | Hayata | 414/476 |
| 5,064,209 | 11/1991 | Kurschat | 280/204 |
| 5,113,959 | 5/1992 | Mastov et al. | 180/11 |
| 5,291,959 | 3/1994 | Malblanc | 180/11 |
| 5,351,774 | 10/1994 | Okamoto | 180/65.1 |

FOREIGN PATENT DOCUMENTS

| | | | |
|---|---|---|---|
| 172906 | 10/1916 | Canada | 180/11 |
| 1475405 | 3/1967 | France | 180/907 |
| 3139295 | 6/1982 | Germany | 180/907 |
| 20066 | of 1903 | United Kingdom | 180/11 |
| 2124985 | 2/1984 | United Kingdom . | |

*Primary Examiner*—J. J. Swann
*Assistant Examiner*—Bridget Avery
*Attorney, Agent, or Firm*—Sughrue, Mion, Zinn, Macpeak & Seas, PLLC

[57] ABSTRACT

A wheelchair combination includes a hand-propelled wheelchair (1) having two large drive wheels (3), at least one front support wheel 950 and a seat for the wheelchair occupant, wherein the combination also includes a separate drive unit (2) having at least one electric drive motor and the requisite batteries therefor. The hand-propelled wheelchair and the drive unit are provided with mutually coacting coupling means and the wheelchair occupant is able to activate the coupling means to couple the wheelchair to the drive unit while seated in his/her seat, so as to obtain a functional motor-driven wheelchair. According to the invention, the drive unit (2) is intended to be coupled to the hand-propelled wheelchair (1) from behind, so that when the unit is connected, it will be located at least partially between the two large drive wheels of the hand-propelled wheelchair (1). The resultant motor-driven wheelchair uses the support wheels (11) of the drive unit as rear wheels, together with the drive wheels (3) of the hand-propelled wheelchair.

10 Claims, 4 Drawing Sheets

WHEELCHAIR COMBINATION

The present invention relates to a wheelchair combination which includes a hand-propelled wheelchair having two large drive wheels, at least one front support wheel, an occupant seat, and a separate drive unit which includes at least one support wheel and at least one electric drive motor and requisite batteries required, and mutually interacting coupling means on the hand-propelled wheelchair and the drive unit, wherein a seated wheelchair occupant is able to personally activate the coupling means in a manner to couple the wheelchair to the drive unit and therewith obtain a functional automotive wheelchair.

Wheelchair combinations of this kind have many benefits. For instance, the occupant of the wheelchair is able to choose whether to propel the wheelchair automotively, which may be practical when travelling long distances outdoors, or whether to propel the wheelchair manually, for instance indoors, because of the ease with which the wheelchair can then be manoeuvered in confined spaces. The fact that the wheelchair can be separated into two units also facilitates transportation and storage of the wheelchair. The ability of the wheelchair occupant to switch personally between manual and power drive also adds an additional safety factor, since the occupant is able to disengage the additional power unit in the event of a unit malfunction or in the event of the batteries running low for instance, and to continue his/her journey or return by manually propelling the lightweight, hand-propelled wheelchair.

U.S. Pat. Nos. 3,351,148 and 3,688,857 both describe wheelchairs which can be coupled to a drive unit by the wheelchair occupant. This is achieved in both cases by transferring the drive unit and associated, heavy batteries on the manually operated wheelchair, which must therewith be strong enough to support the full weight of the drive unit and batteries. This must be taken into account when designing the wheelchair, meaning, among other things, that the wheelchair will be unnecessarily robust and heavy when used as a hand-propelled wheelchair. Furthermore, in both cases, the wheelchair is driven with the aid of rollers which coact with the tires on the larger wheels of the wheelchair. This can result in skidding tendencies in wet weather conditions or on muddy driving surfaces, and will probably make it impossible to drive the wheelchair on snowy surfaces.

These and other known solutions are mainly related to auxiliary motors for a hand-propelled wheelchair, requiring compromises in the construction of the wheelchair. When the wheelchair is used in the mode of a hand-propelled wheelchair, these compromises result in certain drawbacks in comparison with wheelchairs that are constructed solely for manual drive, while the drive unit connected to the wheelchair does not constitute any true alternative to a specially designed motor-driven outdoor wheelchair.

GB-A-2 124 985 describes a wheelchair combination with which a separate drive unit provided with a support wheel can be coupled in front of a manual wheelchair as a towing vehicle. The total length of the resultant combination is such as to make the wheelchair difficult to manoeuver. This combination cannot be compared with or replace specially designed motor-driven wheelchairs. Furthermore, the wheelchair is driven by engagement with the tire of the wheel of the drive unit.

The primary object of the present invention is to provide a wheelchair combination of the kind defined in the introduction which when used as a conventional hand-propelled wheelchair is in a class with the best of the hand-propelled wheelchairs available at present, and which when coupled to its drive unit forms an outdoor wheelchair which will fulfil all the requirements that can be placed on such a wheelchair.

The invention is based on the realization that this object can be achieved with the aid of a construction which requires very little adaptation of the hand-propelled wheelchair and with which essentially all equipment required to convert to a motor-driven wheelchair is included in the drive unit, which is generally self-supporting after being coupled and does not appreciably affect the length of the wheelchair.

According to the present invention, a wheelchair combination of the kind defined in the first paragraph of this document is mainly characterized in that the drive unit is adapted to be coupled to the hand-propelled wheelchair from the rear, so that when coupled the drive unit will be located at least partially between the two large drive wheels of the hand-propelled wheelchair; and in that the resultant motor-driven wheelchair utilizes the support wheel of the drive unit as a rear wheel together with the drive wheels of the hand-propelled wheelchair.

This solution achieves the aforesaid object in that after being coupled to the hand-propelled wheelchair, the drive unit will essentially support its own weight with only insignificant loading of the wheelchair, while enabling the total length of the wheelchair to be kept short at the same time.

It is preferred that when the drive unit is coupled, the unit will transmit a driving force to the axles of the drive wheels of the hand-propelled wheelchair, these drive wheels therewith also functioning as drive wheels for the motor-driven wheelchair.

The drive unit will conveniently include means which when the unit is coupled to the hand-propelled wheelchair will function to tip the wheelchair slightly backwards around the axles of the drive wheels, so that the front support wheel will be lifted out of contact with the underlying surface.

The drive unit will suitably have at least one forward support element and means which as the unit is coupled to the manual wheelchair cause the support element to swing out of contact with the underlying surface. In this regard, the support element is conveniently provided with means which as the support element is lifted, presses against a surface on the chassis of the hand-propelled wheelchair and therewith tip the wheelchair backwards.

According to one preferred embodiment of the invention, the coupling means comprises a claw coupling device adjacent each of the drive wheels provided with separate drive axles, each of these claw coupling devices including two hook-shaped jaws mounted on the drive unit and an actuator means which functions to swing the jaws towards one another and into engagement with a respective seating mounted on respective wheel axles when coupling the drive unit to the hand-propelled wheelchair. Each of the seatings may have the form of a roller which is rotatable in relation to an associated wheel axle and which includes a circumferentially extending groove in which the respective claws engage.

For transmission of driving power from the motors to the driving wheels of the wheelchair, the construction will conveniently include a clutch disc connected with a separate drive axle of respective wheels on the hand-propelled wheelchair, and a further clutch plate driven by the motor and coacting with the first clutch plate on the drive unit, and means for moving the motor-driven clutch plates axially into driving engagement with the clutch plates connected to the wheel axles. There is thus provided a wheel drive which is not influenced by external conditions, such as road surface conditions, etc.

Other features of the invention will be apparent from the following claims.

The invention will now be described in more detail with reference to an exemplifying embodiment thereof and also with reference to the accompanying drawings, in which FIG. 1 illustrates the hand-propelled wheelchair and the drive unit prior to being coupled together, the seat of the manual wheelchair being omitted for the sake of clarity and convenience of illustration;

FIG. 2 illustrates the wheelchair combination after coupling the drive unit to the hand-propelled wheelchair;

FIGS. 3 and 4 respectively illustrate the coupling mechanism before and after coupling the drive unit to the wheelchair;

Figure 1:
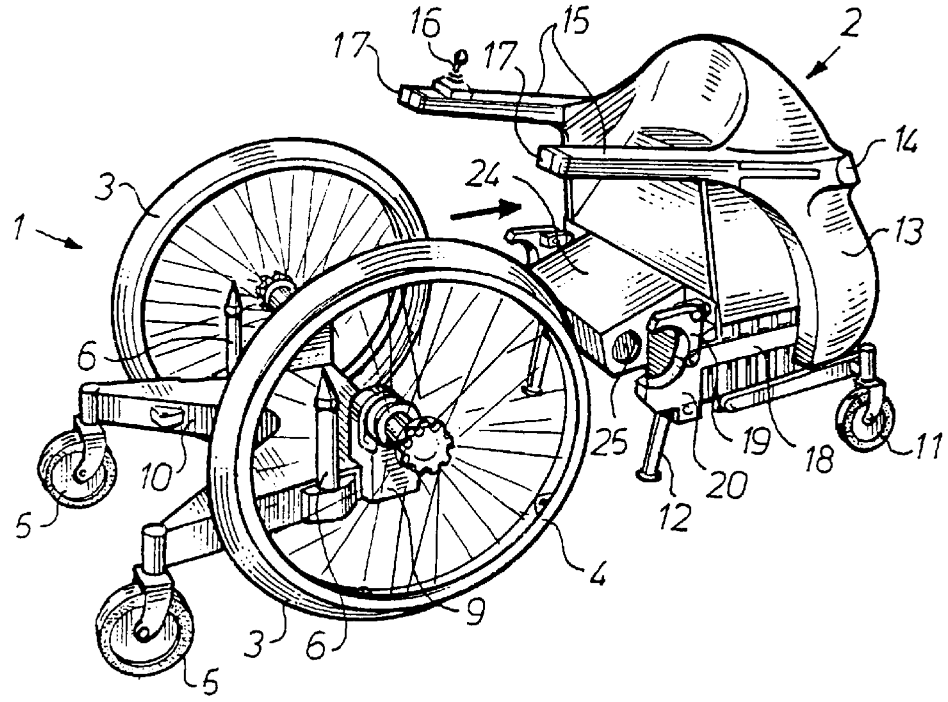

FIG. 1 illustrates a hand-propelled wheelchair 1, with the seat removed, and a drive unit 2 which can be coupled to the wheelchair 1. The wheelchair 1 typically includes two large wheels 3 fitted with drive rings 4 by means of which the wheelchair can be propelled and manoeuvered, and two smaller front support wheels or casters 5. The reference numeral 6 identifies two posts on which a seat 7, shown in FIG. 2, can be adjustably fitted. The construction illustrated in FIG. 2 also includes a foot plate 8.

Each of the wheels 3 is mounted on an individual axle which is journalled in an associated journal bearing housing 9 mounted on the chassis 10 of the wheelchair. This enables the wheels to be easily fitted and dismantled, since the wheels need only be pushed onto and locked on stub axles.

The drive unit 2 includes two rear support wheels or casters 11 and two front elevatable support legs 12. The reference numeral 13 identifies a cover which can be given any desired form and which encloses a space that can be used as baggage space, while located beneath the space is a box-like part 18 in which the requisite batteries are placed, among other things. As will be described in more detail below, an electric motor for driving each wheel is mounted beneath the box 18.

In other respects, the drive unit 2 includes all of the means required to provide an outdoor wheelchair which will fulfil all requirements that can be placed on such a wheelchair, when the drive unit is coupled to the hand-propelled wheelchair 1. The cover 13 is thus provided with rear lights and traffic indicators 14 and armrests 15, of which one is provided with a joystick 16 for manoeuvering the motor-driven wheelchair, and also forms a mud guard over respective wheels 3 when the drive unit is coupled. Headlamps and front traffic indicators 17 are fitted in the front end surfaces of the armrests 15. The hand-propelled wheelchair need not therefore be loaded with any of this equipment or any of these functions, therewith enabling the occupant-driven wheelchair to be constructed solely with the view of providing the best possible and the easiest manoeuvered hand-propelled wheelchair.

Figure 3:
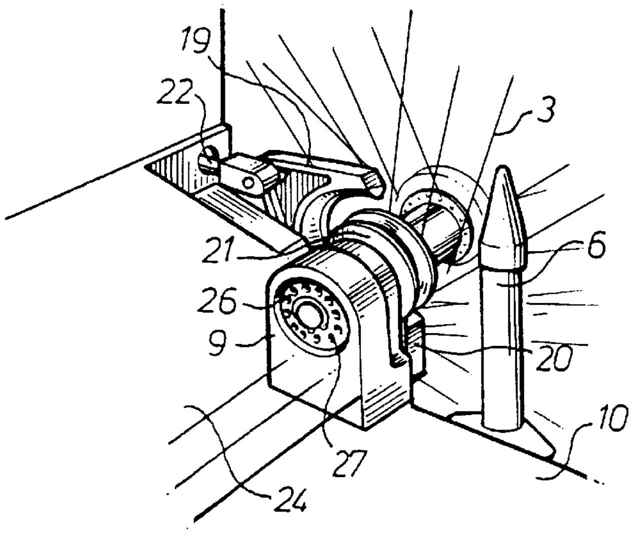
Figure 4:
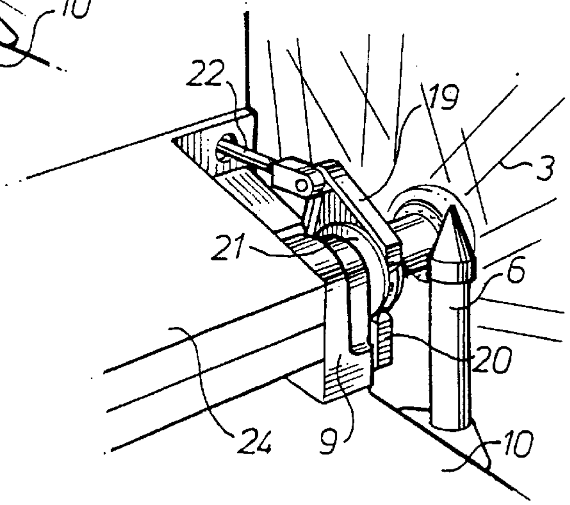

As will best be seen from FIGS. 3 and 4, the drive unit is provided adjacent each wheel with a claw coupling which includes an upper and a lower jaw 19 and 20 respectively. In the illustrated embodiment, the jaws have arcuate engagement surfaces for coaction with a roller 21 which is freely rotatable around respective wheel axles and which includes a circumferentially extending groove for coaction with said jaws. The upper jaw 19 is connected to a piston rod 22 of a hydraulic piston-cylinder device 23, see FIG. 6, for swinging the two jaws towards one another.

The hand-propelled wheelchair 1 is coupled to the drive unit 2, by the wheelchair occupant reversing the wheelchair onto the parked drive unit, with the coupling claws 19 and 20 open to enable the coupling rollers 21 on the wheel axles to be received between the jaws. When the hand-propelled wheelchair has been manoeuvered to a position in which the rollers 21 are located between the jaws 19 and 20, see FIG. 3, the wheelchair occupant activates the hydraulic piston-cylinder device 23, which can be achieved by manipulating a hand-propelled hydraulic pump or by activating a motor-driven pump, therewith to close the jaws around the rollers 21, see FIG. 4. This results in a stable coupling between the wheelchair and the drive unit, wherewith each of the axles of the wheels 3 will be in alignment with a drive axle mounted in a casing 24, this drive axle being driven by a respective motor in the drive unit 2.

Mounted on the end of respective drive axles in the casing 24 is a clutch plate which can be moved axially outwards to some extent through an opening 25 in the casing 24 by means of a respective hydraulic piston-cylinder device, for coaction with a corresponding clutch plate 26 mounted on the end of respective wheel axles, see FIG. 3. This will be described in more detail below with reference to FIG. 5. In the case of this embodiment, the coupling plate 26 includes a plurality of recesses 27 which are intended to receive corresponding pins 28 provided on the corresponding clutch plate 34 of the drive unit.

The hydraulic system is conveniently provided with a pressure controlled valve which when the hydraulic pressure has risen to a given level as a result of the jaws 19 and 20 being fully enclosed around the coupling rollers 21 transfers the hydraulic pressure to those piston-cylinder devices that effect axial displacement of the motor-driven clutch plates into driving engagement with the clutch plates 26 of the wheelchair.

Figure 2:
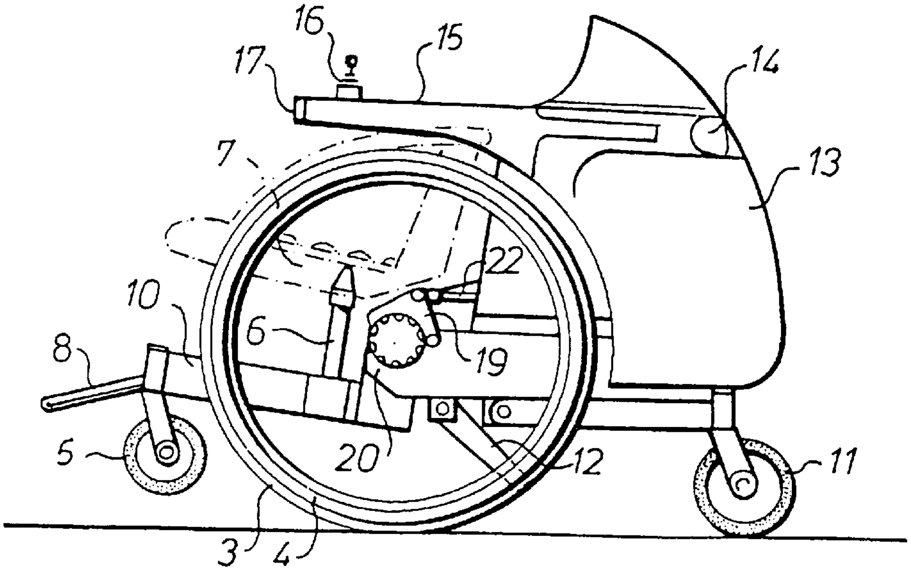
Figure 7:
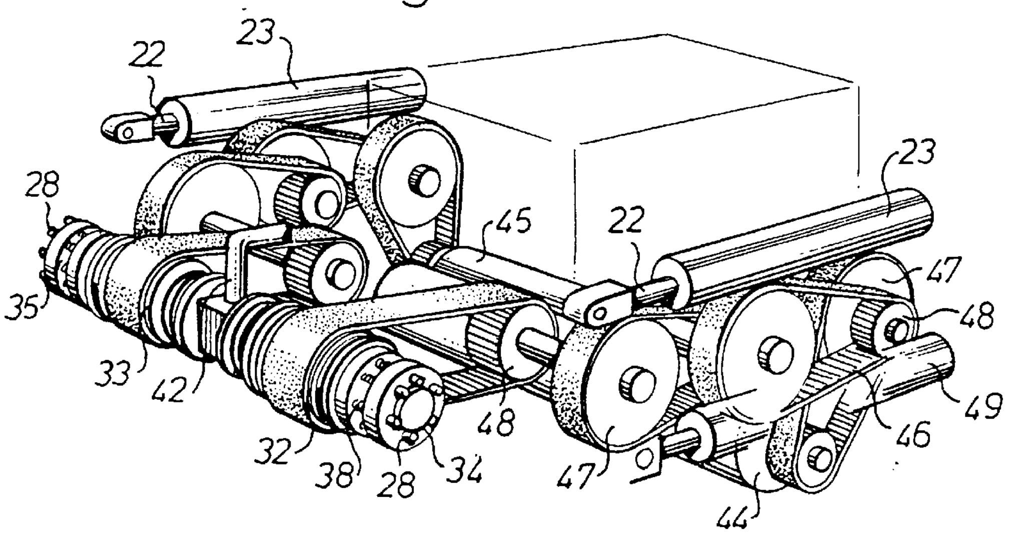
FIG. 7 is a schematic illustration in perspective of the drive means and the drive axles.
Figure 6:
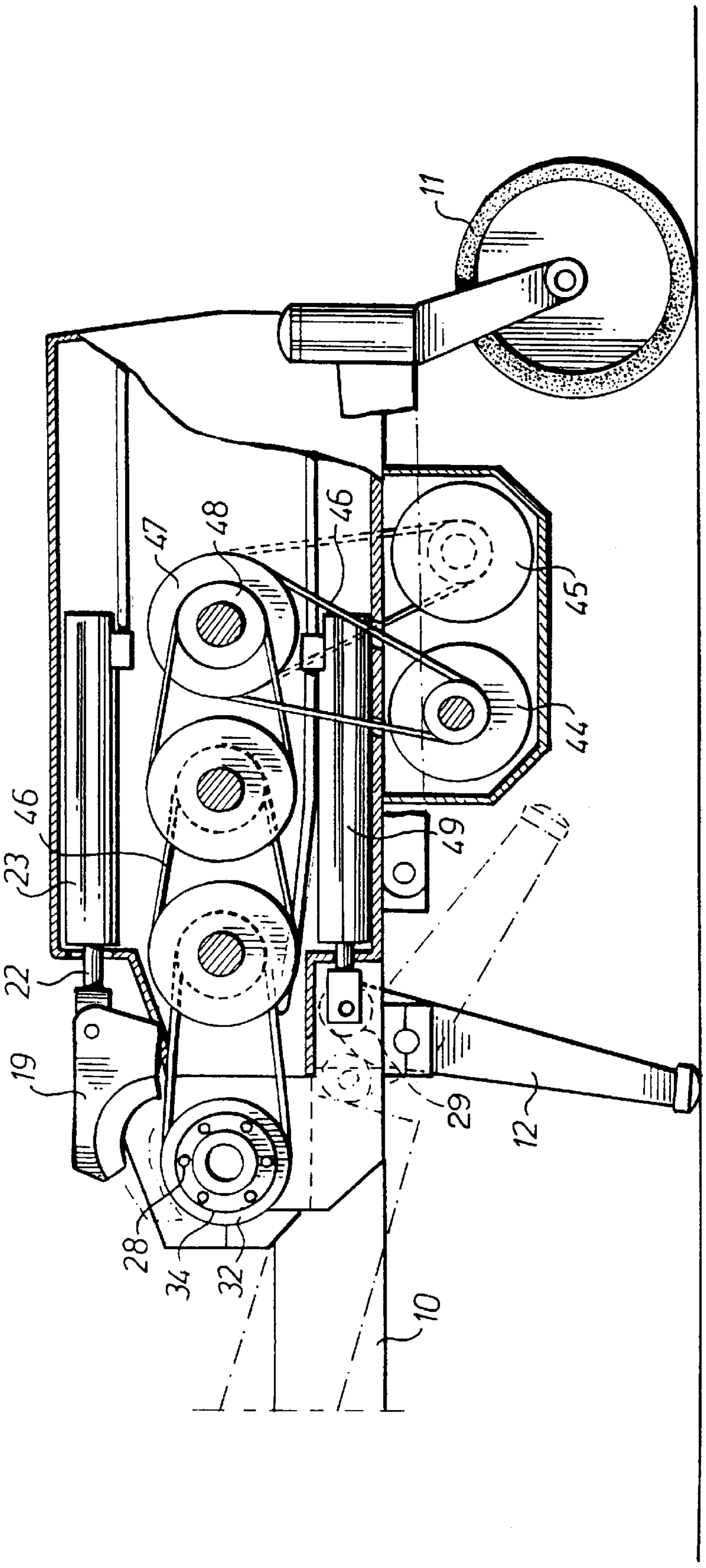
FIG. 6 is a partially sectioned side view of part of the drive unit.

When the clutch plates have been brought into driving engagement with one another, the hydraulic pressure is switched to a respective hydraulic piston-cylinder device 49 mounted on a respective side of the drive unit, see FIGS. 6 and 7, each of said devices 49 functioning to lift one of the support legs 12. The upper end of each leg 12 carries a roller 29 or corresponding device which, when the leg 12 is lifted, is pressed against a rear surface of the chassis 10 of the hand-propelled wheelchair, so as to swing the chassis slightly rearwards around the axles of the drive wheels 3. This is made possible by virtue of the coupling rollers 21 being freely rotatable about the wheel axles. This tipping movement causes the front support wheel 5 of the wheelchair to be swung-up out of engagement with the underlying supporting surface, as illustrated in FIG. 2.

The wheelchair is now ready for use as an ordinary motor-driven wheelchair which utilizes the rear support wheels 11 of the drive unit 2 in addition to the drive wheels 3. There is no need for electrical connections between the two units, since the drive unit motors are controlled with the aid of the joystick 16 mounted on the armrests 15. As the wheels 3 are driven on their respective axles, the wheelchair can be propelled quite satisfactorily irrespective of road surface conditions and weather.

Figure 5:
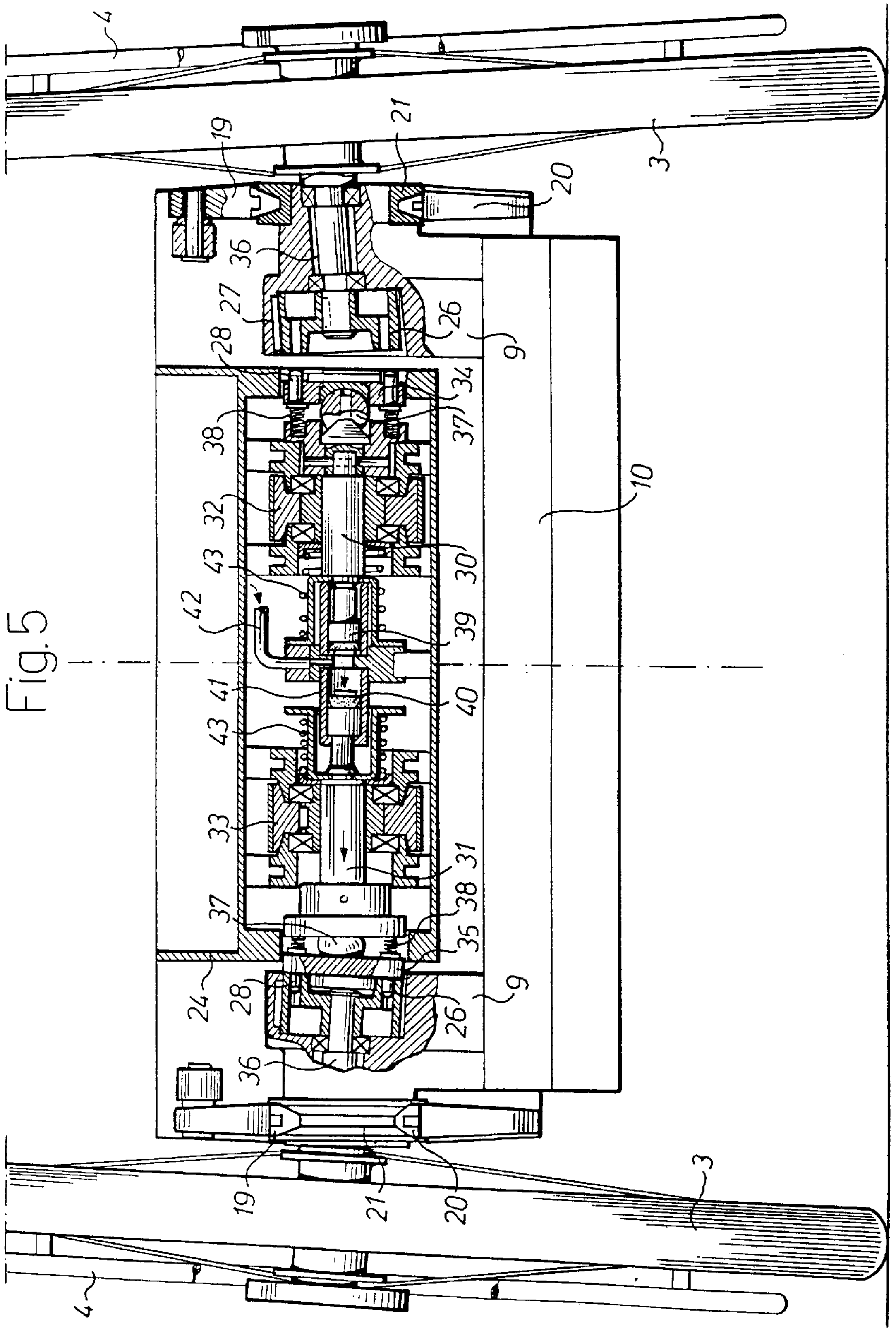
FIG. 5 is a partial section view illustrating the driving power transmission from the drive unit to the drive wheels of the hand-propelled wheelchair.

In FIG. 5, the two drive axles of the drive unit are referenced 30 and 31 and are driven by a respective associated drive motor via belt drives 32 and 33. The axles 30 and 31 are connected to the belt drives 32 and 33 via spline couplings which enable respective axles to move axially. As before mentioned, each of the axles 30 and 31 drive a respective clutch plate 34 and 35 provided with the aforesaid pins 28 for coaction with corresponding recesses 27 on the clutch plates 26 mounted on the wheel axles 36.

In order to enable the wheels 3 to be set to a desired camber, the clutch plates 34 and 35 are each connected to a respective drive axle 30, 31 via an individual ball pivot 37 and guide springs 38. The axles 30 and 31 are connected at their inner ends to respective pistons 39 and 40 in a common cylinder 41, to which hydraulic oil is delivered through a pipe 42.

The pistons 39 and 40 herewith move synchronously with one another in opposite directions to activate respective drive couplings. However, for the sake of illustration, FIG. 5 shows the piston 39 in a non-activated state and the piston 40 in an activated state. The clutch plate 34 connected to the piston 39 has not therefore been moved into driving engagement with the corresponding clutch plate 26 on the wheelchair. On the other hand, the other axle 31 has moved its clutch plate 35 into engagement with the clutch plate 26 on the wheelchair, wherewith the pins on the clutch plate 35 are in driving engagement with the recesses 27 in the clutch plate 26. This movement of the axle 31 and the clutch plate 35 has taken place while compressing a return spring 43.

Thus, the right side of the FIG. 5 illustration represents the state of the drive unit after having coupled said unit to the wheelchair by means of the claw coupling comprising the jaws 19 and 20 and the grooved roller 21, but prior to having activated the coupling of the wheel 3. The left side of the Figure illustrates the state after activating the drive coupling.

FIG. 6 shows how one clutch plate 34 of the drive unit 2 is driven by one of the electric drive motors 44 and 45 mounted beneath the drive unit. In this case, the drive is effected with the aid of belts 46 and a number of large and small belt pulleys 47, 48 for achieving desired transmission. The other clutch plate 35 is driven in a corresponding manner by the other motor with the aid of belt pulleys mounted on the opposite side. The motors are controlled by means of the joystick 16 (FIGS. 1 and 2).

FIG. 7 is a schematic perspective view which is intended to illustrate activation of the clutch plates 34 and 35 more clearly and to show how the different hydraulic piston-cylinder devices may be positioned.

The entire drive mechanism, together with motors and batteries, is supported by the drive unit 2, as evident from FIG. 6, and will not load the wheelchair to any appreciable extent when coupled thereto. This enables the wheelchair to be given a large action radius, since it is possible to include a plurality of batteries and thereby obtain a high battery capacity.

The invention has been described in the aforegoing with reference to an exemplifying embodiment thereof. This embodiment, however, can be modified in several respects within the scope of the claims. For instance, the embodiment can be changed in several respects, among other things with regard to the drive mechanism and the power transmission. Other linear drive means can be used as an alternative to the hydraulic piston-cylinder devices, and the belts can be replaced with other transmission means. The illustrated claw coupling can also be modified. Although not shown, the combination will also include brakes which are applied when no current is delivered to the motor. These brakes may have the form of friction brakes which act on the clutch plates fitted to the wheel axles. The support legs of the drive unit may be replaced with small support wheels or casters if so desired.

I claim:

1. A wheelchair combination comprising:

a hand-propelled wheelchair (1), having two large drive wheels (3), at least one front support wheel (5), and a seat (7) for the occupant of the wheelchair, a separate drive unit (2), which is provided with at least one support wheel (11) and includes at least one electric drive motor (44, 45) and batteries needed therefor, and mutually coacting coupling devices (19, 20, 21) on the hand-propelled wheelchair and the drive unit, wherein the wheelchair occupant is able to activate the coupling devices personally while seated in the wheelchair (1) so as to couple the wheelchair to the drive unit and therewith obtain a functional motor-driven wheelchair, characterized in that the drive unit (2) is constructed to be coupled to the hand-propelled wheelchair (1) from behind, such that when coupled said drive unit will be located at least partially between the two large drive wheels (3) of the hand-propelled wheelchair (1), in that the resultant motor-driven wheelchair utilizes said at least one support wheel (11) of the drive unit as a rear wheel together with the drive wheels (3) of the hand-propelled wheelchair, and in that when coupled, the drive unit (2) functions to transmit power to axles (36) of the drive wheels (3) of the hand-propelled wheelchair, these drive wheels (3) therewith functioning as drive wheels also for the motor-driven wheelchair; and further characterized by means (29) which when coupling the drive unit (2) to the hand-propelled wheelchair (1) function to tip the wheelchair slightly backwards around the axles of the drive wheels (3), so as to swing said at least one front support wheel (5) up out of the engagement with the underlying surface.

2. A wheelchair combination according to claim 1, characterized by means (29) for initiating rearward tipping of the hand-propelled wheelchair (1) in conjunction with lifting said at least one support element (12).

3. A wheelchair combination according to claim 2, characterized in that said at least one support element (12) is provided with means (29) which as said at least one support element is lifted presses against a surface on a chassis (10) of the hand-propelled wheelchair (1) so as to tip the wheelchair backwards.

4. A wheelchair combination comprising:

a hand-propelled wheelchair (1), having two large drive wheels (3), at least one front support wheel (5), and a seat (7) for the occupant of the wheelchair, a separate drive unit (2), which is provided with at least one support wheel (11) and includes at least one electric drive motor (44, 45) and batteries needed therefor, and mutually coacting coupling devices (19, 20, 21) on the hand-propelled wheelchair and the drive unit, wherein the wheelchair occupant is able to activate the coupling devices personally while seated in the wheelchair (1) so as to couple the wheelchair to the drive unit and therewith obtain a functional motor-driven wheelchair, characterized in that the drive unit (2) is constructed to be coupled to the hand-propelled wheelchair (1) from behind, such that when coupled said drive unit will be located at least partially between the two large drive wheels (3) of the hand-propelled wheelchair (1), in that the resultant motor-driven wheelchair utilizes said at least one support wheel (11) of the drive unit as a rear wheel together with the drive wheels (3) of the hand-propelled wheelchair, and in that when coupled, the drive unit (2) functions to transmit power to axles (36) of the drive wheels (3) of the hand-propelled wheelchair, these drive wheels (3) therewith functioning as drive wheels also for the motor-driven wheelchair; and further characterized in that said coupling means is comprised of a claw coupling adjacent each of the drive wheels (3) provided with separate drive axles (36); in that each claw coupling includes two claw-like jaws (19, 20) mounted on the drive unit, and an actuator means (23) which functions to swing the jaws towards one another and into engagement with a respective seating (21) mounted on respective wheel axles (36), when coupling said unit to the wheelchair.

5. A wheelchair combination according to claim 4 characterized in that said seating has the form of a roller (21) which is rotatable relative to an associated wheel axle (36) and which includes a circumferentially extending groove in which the respective jaws (19, 20) are intended to engage.

6. A wheelchair combination comprising:

a hand-propelled wheelchair (1), having two large drive wheels (3), at least one front support wheel (5), and a seat (7) for the occupant of the wheelchair, a separate drive unit (2), which is provided with at least one support wheel (11) and includes at least one electric drive motor (44, 45) and batteries needed therefor, and mutually coacting coupling devices (19, 20, 21) on the hand-propelled wheelchair and the drive unit, wherein the wheelchair occupant is able to activate the coupling devices personally while seated in the wheelchair (1) so as to couple the wheelchair to the drive unit and therewith obtain a functional motor-driven wheelchair, characterized in that the drive unit (2) is constructed to be coupled to the hand-propelled wheelchair (1) from behind, such that when coupled said drive unit will be located at least partially between the two large drive wheels (3) of the hand-propelled wheelchair (1), in that the resultant motor-driven wheelchair utilizes said at least one support wheel (11) of the drive unit as a rear wheel together with the drive wheels (3) of the hand-propelled wheelchair, and in that when coupled, the drive unit (2) functions to transmit power to axles (36) of the drive wheels (3) of the hand-propelled wheelchair, these drive wheels (3) therewith functioning as drive wheels also for the motor-driven wheelchair; and further characterized by a clutch plate (26) which is connected to a separate drive axle (36) of respective wheels (3) on the hand-propelled wheelchair (1), and a motor-driven clutch plate (34, 35) mounted on the drive unit (2) for coaction with the first-mentioned clutch plate (26), and means (39, 40, 41) for moving the motor-driven clutch plates axially into driving engagement with the clutch plates connected to the wheel axles.

7. A wheelchair combination according to claim 6, characterized in that each of the motor-driven clutch plates (34, 35) is mounted on a ball pivot (37) to permit the wheels (3) to be adjusted to a desired camber angle.

8. A wheelchair combination according to claim 6, characterized in that one clutch plate of each pair of clutch plates is provided with spring-loaded drive pins (28), while the other clutch plate of said pair is provided with recesses (27) which receive said drive pins (28).

9. A wheelchair combination according to claim 4, characterized in that respective wheel axles (36) are journalled in a chassis (10) of the hand-propelled wheelchair (1).

10. A wheelchair combination according to claim 6, characterized in that a means for activating the mutually coacting coupling devices (19, 20), the clutch plates (34, 35) and said at least one support element (12) include hydraulic piston-cylinder devices (23, 41, 49) connected to a common hydraulic oil source; and in that valves are provided for controlling each of said hydraulic piston-cylinder devices (23, 41, 49) in sequence.

* * * * *